United States Patent [19]

Flock et al.

[11] 4,423,207
[45] Dec. 27, 1983

[54] PROCESS FOR RECOVERY OF SOLID THERMOPLASTIC RESINS FROM SOLUTIONS THEREOF IN ORGANIC SOLVENTS

[75] Inventors: John W. Flock; Stephen L. Matson, both of Schenectady, N.Y.; Peter H. Bollenbeck, Mt. Vernon, Ind.

[73] Assignee: General Electric Company, Schenectady, N.Y.

[21] Appl. No.: 351,381

[22] Filed: Feb. 23, 1982

Related U.S. Application Data

[63] Continuation-in-part of Ser. No. 217,603, Dec. 18, 1980, abandoned.

[51] Int. Cl.³ .................... C08G 63/70; C08G 65/46
[52] U.S. Cl. ........................ 528/499; 528/500; 528/502
[58] Field of Search .................. 528/499, 500, 502

[56] References Cited

U.S. PATENT DOCUMENTS

| | | | |
|---|---|---|---|
| 2,959,561 | 11/1960 | Kelley | 528/500 |
| 3,189,080 | 6/1965 | Overcashier | 528/500 |
| 3,264,263 | 8/1966 | Baker | 528/498 |
| 3,527,741 | 9/1970 | Hattori | 528/500 |
| 3,772,262 | 11/1973 | Clementi | 528/500 |
| 4,212,967 | 7/1980 | Govoni | 528/500 |

Primary Examiner—C. A. Henderson
Attorney, Agent, or Firm—William H. Pittman; James C. Davis, Jr.; James Magee, Jr.

[57] ABSTRACT

An improved process for the continuous separation of a thermoplastic resin from solutions thereof in organic solvents.

16 Claims, 1 Drawing Figure

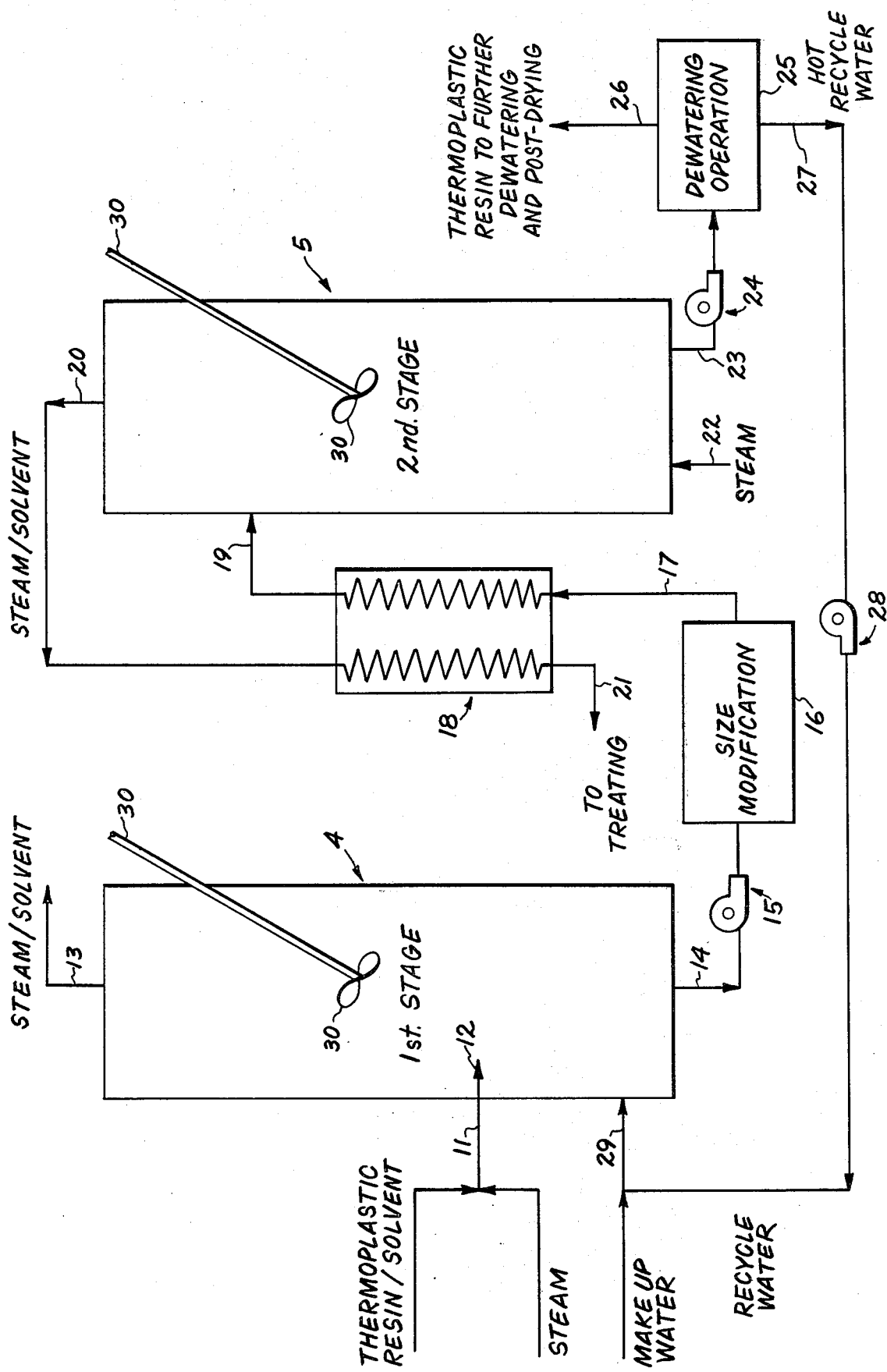

PROCESS FOR RECOVERY OF SOLID THERMOPLASTIC RESINS FROM SOLUTIONS THEREOF IN ORGANIC SOLVENTS

This application is a continuation-in-part of copending application Ser. No. 217,603, filed Dec. 18, 1980, now abandoned, and assigned to the same assignee as the present invention.

THE PRIOR ART

Several methods have been suggested for the separation of thermoplastic resins and in general of polymers from their solutions in organic solvents.

In one method disclosed for example in U.S. Pat. No. 3,031,438, the olefin polymer solution is introduced into the separation vessel and dispersed in hot water by means of an agitator. The solvent is removed in a one stage steam stripping step. Several drawbacks are inherent in this method, among them being a high consumption of energy due to the necessity of utilizing an amount of steam sufficient to remove the solvent from the polymer slurry in one solvent removing step. Another disadvantage resides in the fact that in spite of the treating process, the resulting polymer which contains a substantial amount of solvent is in a morphological form which is convenient with rapid solvent removal, i.e. large particles.

Still another method, as disclosed in U.S. Pat. No. 3,684,783 provides for a one-stage process for separating a solid rubbery polymer of a monomeric olefin from solvent and water vapors by heating the mixture of polymer and diluent with steam and water at an elevated temperature and thereafter passing from the mixing zone the solvent and water vapors containing the particulate solid polymer to an upright centrifugal vaporsolid separation zone. Inherent in this process is the requirement for excess amounts of steam to accomplish solvent removal resulting in low solvent content in the polymeric product. Again, large particles are processed.

A further method as disclosed in U.S. Pat. No. 3,590,026, provides for removing the solvent in a two-stage stripping system wherein some of the solvent is removed in a first stage stripper and most of the solvent remaining is removed in a secondary steam stripper. The disadvantages inherent in the process are the requirement for a suitable dispersant, the great amount of energy consumed as steam in the process resulting from pressure differentials, e.g. high second stage pressure, as well as the lack of heat recovery which could be returned to the second stage for volatilizing solvent.

THE PRESENT INVENTION

An object of this invention is to provide a new and improved process for the recovery of thermoplastic resins from solutions thereof in organic solvents (also referred to as a polymerization effluent), which method does not have the drawbacks and disadvantages of the Prior Art.

Another object is to provide a method in which the solvent is removed with low consumption of steam, and at a considerable savings in energy consumption.

Another object of this invention is to obtain solid thermoplastic resins having a controlled morphology and granulometry which dry more quickly thereby conserving energy.

Another object of this invention is to obtain solid thermoplastic resins having a controlled morphology and granulometry, which may be used directly in extrusion equipment, such as in bulk molding compositions, liquid injection molding compositions, and the like.

The aforesaid objects and others are achieved by means of a process comprising the following:

(a) introducing a thermoplastic resin organic solvent solution into a first separation vessel by a first conduit means terminated with atomizing means, in communication with an intermediate region of said first separation vessel, removing a mixture of solvent and water vapor as an overhead product from said first separation vessel, condensing said overhead product and passing the condensate to a solvent recovery apparatus, recovering a bottom product comprising a slurry mixture of a thermoplastic resin, solvent and water and passing said bottom product to subsequent separation stages for further solvent and water removal.

According to the present process there may be conveniently used solutions of thermoplastic resin having a concentration of up to 30% by weight.

Solutions with a low concentration of polycarbonate of high molecular weight, such as are directly obtained according to known synthesis processes carried out in the presence of a solvent for a polymer, are particularly suitable for use in the practice of this invention.

Exemplary of such solutions are the solutions obtained by interfacial polycondensations of bisphenol-A, preferably using methylene chloride as solvent and in general containing up to 20% by weight of polycarbonate.

Among the thermoplastic resin compositions which may be treated according to the process of the present invention are polyester resins, for example, polyethylene terephthalate, polybutylene terephthalate, etc.; polyimide resins, polyurethane resins, and polyphenylene oxide resins as are more particularly disclosed and claimed in U.S. Pat. No. 3,306,875, issued Feb. 28, 1967, etc.

Examples of solvents which may be extracted or removed from thermoplastic resins according to the novel process disclosed herein are, chlorinated and brominated hydrocarbons having from one to two carbon atoms, e.g., methylene chloride, 1,1,2,2-tetrachloroethane, 1,2-dichloroethylene, chloroform, 1,1,2-trichloroethane aliphatic and aromatic hydrocarbon solvents such as benzene, heptane, xylene, toluene, mesilytene, etc.

Heat may be recovered and recycled from the overhead vapor products from the first or any subsequent separation stages or from the polymer containing bottom product from any stage with said heat being utilized, for example, to preheat polymer solution inputs or make-up water, etc.

One embodiment of the process of the present invention would be to utilize the condensed or partially condensed overhead products to supply enthalpy to the first separation vessel by condensing or cooling these overhead products in a jacket surrounding the first separation vessel and then conveying this overhead product to a solvent recovery apparatus.

Yet another embodiment according to the present invention disclosed herein would be to use the enthalpy of the condensed or partially condensed overhead product to pre-heat the polymerization effluent prior to introducing same into the first separation vessel. This pre-heat treatment of the polymerization effluent is accomplished by utilizing a heat exchange apparatus prior to introduction of the polymerization effluent into the first separation vessel.

The solvent recovery apparatus as used in the practice of the invention disclosed herein may be of any suitable type known in the art and more specifically may comprise a heat exchange apparatus similar to that disclosed above having means therein for (1) water-cooled condensation of the solvent mixture, (2) a phase separation apparatus to separate solvent vapor, solvent liquid, and aqueous liquid phases and (3) a steam stripping column to recover solvent from the aqueous phase. For a discussion of an example of the components comprising the solvent recovery apparatus see Foust et al., *Principles of Unit Operations,* John Wiley and Sons, Inc., New York, New York, 1960 at pp. 11 through 19 and page 224.

An important feature of the present invention is the use of atomizing means for the introduction of the polymer solution into the separation vessel. A polymer solution can be atomized into small particles by passing through, for example, a nozzle. Smaller particles have higher surface area to volume ratio which provides for rapid evaporation of volitles from the particles and also provides more rapid diffusion of the solvent to the surface of the particle because of its small size. An additional advantage of small particles in the separation stage is an improved morphology in the resulting dried polymer.

The resin solvent feed mixture is introduced to the first separation vessel with steam if desired, by means of atomizing means, for example, a nozzle or nozzles, located internally and below the surface of the aqueous solution contained therein, which solution is stirred by means of a motordriven agitator or impeller located within the first separation vessel. The reason for having the nozzle below the water surface is threefold. First, by allowing the thermoplastic resin solvent mixture to be injected below the surface, particles of defined size are realized which enhances the solvent removal in subsequent stages. Secondly, the nozzle system thus contained within the first separation vessel allows for a more uniform dispersion of the resinous particulate material through the water slurry in the vessel without the requirement for an excess of steam for mechanical transport of the particulate thermoplastic resin material and thirdly, the morphology, i.e., the porosity and pore size distribution of the resulting particulate resinous material is subject to greater control which further promotes solvent removal by increasing diffusion of the solvent to the surface of the particles. In addition to the above stated advantages, the nozzle assembly incorporated into the system allows for the formation of particulate material eliminating the requirement for a dispersing agent as taught in U.S. Pat. No. 3,590,026 which dispersing agent may be retained as a contaminant in the final polymeric material.

The polymeric particle size produced by the nozzle is extremely important. Smaller particles provide more contact with the steam, better flashing of the solvent from the particles and also a better particle morphology in the polymer product. Agglomeration of the particles may take place in the separation vessel even with short residence times, however, the agglomerates of the present process are composed of small particles and are porous allowing rapid solvent diffusion even from the agglomerates.

Prior art methods provided slow, low pressure polymer solution feed to the first separation vessel producing very large particles or strings of solution which were subsequently broken into smaller particles by impeller agitation. In a preferred embodiment of the present invention the polymer feed solution is passed through a nozzle under high pressure which produces solvent flashing, small primary particles and porous secondary agglomerate granules. Agitation can supplement the nozzle in dispersing the particles.

The product of the first stage is a water slurry of the polymer particles which still contain some solvent. The remaining solvent must be substantially removed in a subsequent stage or stages to prevent gross agglomeration of the polymers.

Subsequent stages may be preceeded by compaction and milling operations to remove excess water and adjust granule size.

Second stages which can be used in the process of the invention include any of the methods in the prior art for removing water and volitile solvent from a slurry as described above, for example, slurry granulation, fluidized beds, steam driven spiral dryers, nitrogen countercurrent column dryers, etc.

A third stage, or post dryer, e.g. a nitrogen or air driven fluidized bed can also be used if necessary.

Suitable nozzles which may be used in the practice of the present invention are of three basic types. The first is the "hydraulic atomizing" type manufactured by Spraying Systems, Inc. Wheaton, Ill., Model No. ¼ LN2. A second nozzle type which may be used is an "Air" atomizing nozzle which utilizes a stream of steam in lieu of air to effect the dispersion of the thermoplastic resin and solvent mixture and to bring the mixture into intimate contact with steam as the effluent is introduced into the first separation vessel. Typically, the air atomizing nozzles may be of the internally or externally mixing types. Examples of internally mixing are the ¼ J series, Fluid Cap #2050 and Air Cap #67147. Exemplary of the externally mixing air atomizing nozzles is the ¼ J series Fluid Cap #1650 and Air Cap #64. A third nozzle is an ultrasonic nozzle of the internally or externally mixing type. Of the ultrasonic nozzle types, the internally mixing type is preferred in the practice of the invention and can be, for example, model RX 200 available from Discoil, Inc., Belleville, Ontario, Canada. Exemplary of the externally mixing type ultrasonic nozzle is the "M" Style Sonicore Nozzle Assembly Model MB-2 manufactured by Sonic Development Corporation, Upper Saddle River, N.J.

In addition to the atomizing means apparatus, a preferred embodiment of the invention has a heat exchange and a size modification unit between the first separation vessel and subsequent stages. The size modification unit serves the purpose of reducing the overall particle size, if desired, of the thermoplastic resin exiting the first separation vessel to a value of from about 0.4 to about 1.2 mm mass mean particle diameter. An impact-type hammermill such as Fitzmill TM is manufactured by the Firzpatrick Company of Chicago, Ill. is a suitable size modification unit for use in the invention disclosed herein. Of importance is the recognition that with a decrease in the particle size of the thermoplastic resin, one is able to effect an increase in the amount of solvent that is removed in the solvent extraction process as a consequence of the reduced distance for diffusion of solvent out of the thermoplastic resin particles. The particle size of the thermoplastic resin material is reduced within the size modification apparatus prior to conveying the thermoplastic resin to the heat exchange apparatus. This is preferred because the thermoplastic resin is less plastic or gummy at this cooler stage in the process and can be more effectively milled in the size modification apparatus. The temperature of the thermoplastic resin is increased substantially in the heat exchange apparatus and as a result would exhibit a tendency to fuse in a subsequent milling process.

Once the thermoplastic resin and solvent effluent has passed through the size modification unit and heat exchanger it is transported by conduit means to further separation means.

The particulate resin aqueous mixture is then dewatered by passing through a dewatering unit where it is separated from the water carrier. The dewatering unit may be for example of the gravity draining type having a screw conveyer with screen bottom or may be of any of several other continuous dewatering units such as a roll compaction device, an example of the latter being a Chilsonator TM manufactured by Fitzpatrick Company, Chicago, Ill.

The hot recycled water coming off of the dewatering unit may be carried back and recycled to the first separation vessel by suitable conduits and centrifugal pumps such as those manufactured by A-S-H Pump Company, a subsidiary of Envirotech Corporation, Paoli, Pa. This recycling system in cooperation with the heat exchanger allows for the enhanced efficiency as exemplified by the example given below.

The equipment used for realizing this process is of limited dimensions; in it the separation of the thermoplastic resin takes place in a continuous cycle, with operational times that are very short and with a low consumption of energy, in particular of steam, thereby achieving conditions of high productivity in a very economical way.

More particularly, a specific embodiment of the present invention comprises two separation vessels. The first separation vessel incorporating an atomizing nozzle operates at conditions requiring low steam consumption and functions primarily for the purposes of bulk solvent removal and specific particle size formation. The second separation vessel operates at higher temperatures and functions to effect residual solvent removal. The system as a whole is designed so that the operating pressures within the vessels may be modified to provide the most efficient energy saving design.

Suitable apparatus or equipment useful in practicing this invention is shown in the accompanying drawing which is an overall view of an embodiment of the apparatus.

DESCRIPTION OF THE DRAWING

Referring to the drawing, a mixture of thermoplastic resin or polymer and a volatile solvent, is mixed with steam, if desired, and fed to the first separation vessel 4 by means of conduit 11 which enters said first separation vessel at a geometry intermediate region near the bottom thereof. The first separation vessel operates at a pressure of from about 0.1 atmosphere to about 2 atmospheres pressure and at a temperature of from about 45° C. to about 120° C. Conduit 11 is equipped with a suitable nozzle assembly 12 through which the effluent runs in the direction as schematically represented in the drawing. Nozzle assembly 12 can be a single nozzle or there may be a multiplicity of nozzles for the dispersion of thermoplastic resin effluent into the first separation vessel 4. The nozzle assembly which disperses the thermoplastic resin effluent is located in a position beneath the surface of the water contained within the first separation vessel. As the thermoplastic resin effluent is introduced into the first separation vessel, a mixture of makeup water at ambient temperature and hot recycle water is introduced by means of conduit 29 at a temperature of from about 45° C. to about 120° C. This mixture combines with the contents of the first separation vessel and provides for a rapid volatilization of the solvent contained within the polymer effluent within the first separation vessel. As the solvent is volatilized, particles of the thermoplastic resin form within the slurry. The particle size and morphology is determined by a combination of nozzle design, operating conditions, especially temperature, and residence time of the particles within the first separation vessel.

There is provided, as indicated in the drawing, an impeller 30 which insures that the polymer effluent is thorougly admixed with the slurry water contained within the first separation vessel. A mixture of solvent and water vapor comes off as an overhead product from the first separation vessel by means of conduit 13 which is in communication with an upper region of the first separation vessel. This overhead product is subsequently condensed and passed to a solvent recovery apparatus. By means of conduit 14 which is located in an intermediate region of the bottom of the first separation vessel, a bottom product comprising a slurry mixture of a thermoplastic resin, solvent and water is removed and pumped by means of a centrifugal slurry pump 15 to the next stage of the process.

From the slurry pump 15, the slurry passes to a size modification unit 16. While the drawing depicts the incorporation of a single size modification unit, it is to be understood that this step in the process of the present invention is optional depending upon the type of nozzle or nozzles used, the operating conditions within the first separation vessel, and the other residence time of the thermoplastic resin particles dispersed in the slurry water contained within the first separation vessel, and the residence time of the thermoplastic resin particles dispersed in the slurry water contained within the first separation vessel. The use of nozzles may negate the necessity of using a size modification unit.

The purpose of the size modification unit 16 is to insure that the particulate thermoplastic resin or polymeric material introduced therein conforms to a morphology and particle size most suitable for final solvent removal in the second separation vessel 5. Having been thus treated, the thermoplastic resin slurry is conducted by means of conduit 17 into a heat exchange apparatus 18.

The bottom product comprising a slurry mixture of a thermoplastic resin, solvent and water enters the heat exchange apparatus at approximately 75° C. At this time the overhead product coming off of the second separation vessel 5 is conducted to the heat exchange apparatus in a direction counter-current to the flow of the bottom product from the first vessel and at a substantially higher temperature, i.e., at about 99.3° C., than the product (approximately 75° C.) entering the heat exchange apparatus by means of conduit 17. In the heat exchange apparatus there is an exchange of enthalpy from the overhead product entering said heat exchange apparatus by conduit 20 and the bottom product entering the heat exchange apparatus by means of conduit 17, which increases the temperature of the bottom product as it leaves the heat exchange apparatus by means of conduit 19 and enters into the second separation vessel. Since there is an exchange of heat, the quantity of steam being introduced into the second separation vessel is substantially decreased and increases the removal of the remaining solvent within the second separation vessel. As the heat exchange occurs, a portion of the overhead product condenses as the temperature decreases. Once the exchange of heat has occurred in the heat exchange apparatus between the bottom product and the overhead product from the first and second separation vessels respectively, the steam and solvent mixture comprising liquid and vapor phases is conveyed by conduit 21 away from the heat exchange apparatus. Since this steam and solvent mixture exits the heat exchange apparatus at approximately 80° C., it may be further utilized to heat the first separation vessel prior to solvent and steam separation or to preheat the polymerization effluent prior to introduction of said polymerization effluent into the first separation vessel, thereby further decreasing the loss of reusable heat and steam consumption. After the exchange of heat takes place, the bottom product or thermoplastic resin slurry is conveyed into the second separation vessel by means of conduit 19. Upon entering the second separation vessel 5 which operates at a pressure of from about 0.1 atmospheric to about 2 atmospheres and at a temperature of from about 45° C. to about 120° C., steam is introduced by means of conduit 22 located intermediate the bottom portion of the second separation vessel. The temperature of steam thus entering the second separation vessel is at approximately 110° C. or higher and the overall temperature within the second separation vessel is from 45° C. to about 120° C. As with the first separation vessel the second separation vessel 5 is equipped with an impeller 30 for the purpose of maintaining a homogeneous mixture of thermoplastic resin slurry within the second separation vessel. By means of conduit 20 an overhead product comprising a steam and solvent mixture is removed from the second separation vessel and conveyed to the heat exchange apparatus for treatment as described above. At the same time a bottom product comprising a slurry mixture of thermoplastic resin and water is removed by means of conduit 23 and pumped to the next stage of the process by means of centrifugal slurry pump 24. This slurry mixture leaving the second separation vessel as a bottom product at a temperature of from about 45° C. to about 120° C. is conveyed to a dewatering operation 25.

The dewatering step or operation 25 allows for the gravity draining of the hot water component of the bottom product taken out of the second separation vessel. The dewatering operation may be accomplished by a gravity draining device containing a screw conveyer with a screen bottom. Following the dewatering operation the thermoplastic resin is conveyed by conduit 26 to further dewatering and post drying which provides a product having high purity which may be directly used in hot melt extrusion, and the like. The hot water separated from the resin has a temperature of from about 45° C. to about 120° C., and is recycled by means of conduit 27 through centrifugal pump 28 back to conduit 29 where it is mixed with makeup water entering the first separation vessel. There the hot recycle water mixes with the ambient makeup water and is introduced into the first separation vessel by conduit 29 located intermediate the bottom portion of the first separation vessel. By recycling the hot water in this fashion a significant savings in energy is realized over the system as a whole.

DESCRIPTION OF THE PREFERRED EMBODIMENT

The process of the invention may be better understood by reference to the following description of a specific embodiment as applied to the accompanying drawing.

A polymerization effluent comprising a mixture of 20%, by weight polycarbonate in methylene chloride, (1 lb. of polycarbonate per 4 lbs. of methylene chloride) is admixed with steam (0.2 lbs. of steam per lb. of polycarbonate), and introduced by means of conduit 11 into the first separation vessel 4 through nozzle assembly 12. As the polymerization effluent and steam mixture enters the first separation vessel, a mixture of hot recycle water at 99.3° C. (20.8 lb. water per lb. of polycarbonate) and ambient temperature makeup water (approximately 0.3 lbs. of makeup water per lb. of polycarbonate) is introduced simultaneously. The first separation vessel 4 has a mean temperature of 75° C. at 1 atmosphere pressure, and processes approximately one pound per hour of polycarbonate per gallon of vessel capacity. The methylene chloride and water vapor is separated off from the first separation vessel as an overhead product. The solvent and water vapor mixture comes off at approximately 75° C. and comprises approximately 0.51 lbs. of steam per pound of polycarbonate and 3.9 lbs. of methylene chloride per lb. of polycarbonate, consuming 0.19 lbs. steam per lb. of resin. This steam and solvent mixture is removed from the first separation vessel by means of conduit 13 and taken to a solvent recovery apparatus (not shown) in communication with conduit 13.

As the polymeric material or polycarbonate is introduced into the first separation vessel, the impeller 30 operates to effect a homogeneous dispersion of the polymerization effluent within the first separation vessel. As the steam solvent overhead is being drawn off a bottom product comprising a slurry mixture of polycarbonate, methylene chloride and water is removed by means of conduit 14 and pumped by means of pump 15 to a size modification apparatus 16. The particulate polycarbonate has a diameter of from about 0.4 millimeters to about 1.2 millimeters. From the size modification apparatus 16 the bottom product is conveyed to a heat exchange apparatus a temperature of approximately 93.6° C. is obtained. The heat exchange apparatus surface area required to effect this heat transfer is from about 0.1 square feet to about 0.2 square feet per pound of polycarbonate processed per hour. This bottom product is conveyed by conduit 19 into the second separation vessel. With the introduction of the bottom product from conduit 19, steam at 186° C. is simultaneously introduced by means of conduit 22 located intermediate a bottom region of the second separation vessel. The temperature within the second separation vessel is approximately 99.3° C. at one atmosphere pressure, and from about one-half pound to one pound per hour of polycarbonate is processed per gallon of vessel capacity. As in the first separation vessel an impeller 30 is provided to evenly disperse the bottom product and expose same to the steam entering the second separation vessel. A top or overhead product comprising a mixture of methylene chloride and water vapors having an average ratio of 0.72 lbs. of steam per lb. of polycarbonate, and 0.09 lbs. of methylene chloride per lb. of polycarbonate is removed by means of conduit 20. This overhead product has a temperature of approximately 99.3° C. and is conveyed by means of conduit 20 to heat exchange apparatus 18. At this stage of the process the overhead product of the second separation vessel entering the heat exchange apparatus provides the heat to increase the temperature of the bottom product obtained from the first separation vessel from approximately 75° C. to approximately 93.6° C. As the overhead product of the second separation vessel exits the heat exchange apparatus at 80° C., it is conveyed by conduit 21 to a solvent recovery apparatus (not shown) in communication with conduit 21.

As the overhead product of the second separation vessel is taken off, a bottom product comprising a slurry mixture of polycarbonate and water with a minimum solvent content is removed by means of conduit 23. This slurry mixture has a temperature of approximately 99.3° C. and comprises 4.6 weight percent polycarbonate is water and from about 0.1 percent to about 1 percent solvent retained within the polycarbonate. This slurry mixture is pumped by means of pump 24 to the dewatering operation 25 wherein water is removed and the polycarbonate conveyed by means of conduit 26 to further dewatering and post drying. The hot water removed is conveyed by means of conduit 27 and pump 28 back to conduit 29 where it is mixed with makeup water at ambient temperature entering the first separation vessel.

The resulting polycarbonate treated according to the process of this invention has an average particle size of approximately 1.2 millimeters and a methylene chloride content of approximately 1.0%.

We claim:

1. A process for recovering a thermoplastic polycarbonate or polyphenylene oxide resin from a solution of said resin in a solvent comprising introducing said solvent solution into a first separation vessel by a first conduit means terminated with atomizing means in communication with an intermediate region of said first separation vessel and below the surface of the liquid contained therein, removing a mixture of solvent and water vapor as an overhead product from said first separation vessel, condensing said overhead product and passing the condensate to a solvent recovery apparatus, removing a bottom product comprising a slurry mixture of a thermoplastic resin, solvent and water and passing said bottom product to subsequent separation stages for further solvent and water removal.

2. The process of claim 1 wherein said bottom product removed from said first separation vessel is conveyed to a size modification unit between said first separation vessel and subsequent stages.

3. The process of claim 1 wherein said first separation vessel is equipped with internal agitators to effect dispersion and mixing of said thermoplastic resin solution with said slurry contained within said separation vessel.

4. The process of claim 1, where said first separation vessel is provided with a conduit means in communication with a lower region of said first separation vessel for the independent introduction of steam therein.

5. The process of claim 1, wherein steam is simultaneously introduced with the polymerization effluent into the first separation vessel by said first conduit means.

6. A process for recovering a thermoplastic polycarbonate or polyphenylene oxide resin from a solution of said resin in a solvent comprising introducing the resin solvent solution into a first separation vessel by a first conduit means terminated with atomizing means in communication with an intermediate region of said first separation vessel and below the surface of the liquid contained therein, supplying additional heat to said first separation vessel from hot recycled water as is hereinafter described, removing a mixture of solvent and water vapor as an overhead product from said first separation vessel by means of a second conduit means in communication with an upper region of said first separation vessel, condensing said overhead product and passing the condensate to a solvent recovery apparatus by means of said second conduit means, removing a bottom product comprising a slurry mixture of said resin, solvent and water from said first separation vessel by means of a third conduit means to a heat exchange apparatus, passing said bottom product through a fourth conduit means communicating from said heat exchange apparatus into a second separation vessel by means of said fourth conduit means in communication with an intermediate region of said second separation vessel, and simultaneously introducing steam into said second separation vessel by means of a fifth conduit means in communication with a lower region of said second separation vessel, removing a mixture of solvent and water vapor as an overhead product of said second separation vessel by means of a sixth conduit means in communication with an upper region of said second separation vessel, recovering the enthalpy of said solvent and water vapor mixture by passing said mixture to said heat exchange apparatus by means of said sixth conduit means in communication with said heat exchange apparatus, effecting an exchange of heat in said heat exchange apparatus between the bottom product entering the heat exchange apparatus by means of said third conduit means and the overhead product of the second separation vessel entering said heat exchange apparatus by means of said sixth conduit means, removing a solvent and water vapor product from said heat exchange apparatus by means of a seventh conduit means and treating said solvent and water product in a solvent recovery apparatus in communication with said seventh conduit means, recovering a bottom product of said second separation vessel comprising a slurry mixture of said resin and hot water by means of an eighth conduit means in communication with a dewatering zone, separating said hot water from said resin in said dewatering zone and recycling said hot water from said dewatering zone by means of a ninth conduit means communicating from said dewatering zone to a tenth conduit means where said hot recycle water is mixed with make-up water entering said first separation vessel by means of said tenth conduit means in communication with an intermediate region of said first separation vessel, and thereafter treating said resin to further dewatering and drying and removing the resin from the dewatering zone by an eleventh conduit means.

7. The process of claim 6 wherein said bottom product removed from said first separation vessel is conveyed to a size modification unit between said first separation vessel and said heat exchange apparatus by means of a conduit in communication with the bottom region of said first separation vessel and said size modification unit, and subsequently conveying said bottom product to said heat exchange apparatus by a conduit between said size modification unit and said heat exchange apparatus.

8. The process of claim 6 wherein the enthalpy generated by the condensation of a portion or all of said overhead product of said second separation vessel is recycled to preheat the polymerization effluent prior to introducing said polymerization effluent to said first separation vessel.

9. The process of claim 6 where the enthalpy generated by the condensation of a portion or all of said overhead product of said second separation vessel is recycled to a jacket surrounding the first separation vessel to heat same during the introduction of the polymerization effluent into said first separation vessel.

10. The process of claim 6 wherein said first separation vessel and said second separation vessel are equipped with internal agitators to effect dispersion and mixing of said thermoplastic resin solution with said slurry contained within the separation vessels.

11. The process of claim 6 wherein said first and second separation vessels are operated at a temperature of from about 45° C. to about 120° C. with a pressure from about one-tenth atmospheric to about twice atmospheric.

12. The process of claim 1, where said first separation vessel is provided with a conduit means in communication with a lower region of said first separation vessel for the independent introduction of steam therein.

13. The process of claim 1, wherein steam is simultaneously introduced with the polymerization effluent into the first separation vessel by said first conduit means.

14. The process of claim 1 or 6, wherein the mass mean particle diameter of the recovered thermoplastic resin is from about 0.4 mm to about 4.0 mm.

15. The process of claim 1, 2, 3, 4, 5, 6 or 7 wherein the thermoplastic resin is a polycarbonate and the solvent is methylene chloride.

16. The process of claim 1, 2, 3, 4, 5, 6, or 7 wherein the thermoplastic resin is a polyphenylene oxide and the solvent is toluene.

* * * * *